United States Patent
Ichioka et al.

(10) Patent No.: US 7,032,985 B1
(45) Date of Patent: Apr. 25, 2006

(54) HEART CAM AND DAMPER UNIT AND OPENING/CLOSING CONTROLLING DEVICE USING THE SAME

(75) Inventors: Hiroaki Ichioka, Kanagawa (JP); Takeo Mitsueda, Kanagawa (JP); Takaki Mizuno, Aichi (JP)

(73) Assignee: Piolax Inc., Yokohama (JP)

( * ) Notice: Subject to any disclaimer, the term of this patent is extended or adjusted under 35 U.S.C. 154(b) by 53 days.

(21) Appl. No.: 10/790,243

(22) Filed: Mar. 2, 2004

(30) Foreign Application Priority Data

Mar. 3, 2003 (JP) .......................... P.2003-055675

(51) Int. Cl.
 E05B 65/44 (2006.01)
 F16D 57/02 (2006.01)
 E05C 19/02 (2006.01)

(52) U.S. Cl. .......................... 312/319.2; 16/51; 16/82; 188/290; 192/216; 292/99; 292/198

(58) Field of Classification Search ............... 192/216; 16/51, 52, 53, 82, 85, 319, 321, 342; 312/319.1, 312/319.2; 188/290; 292/99, 198
See application file for complete search history.

(56) References Cited

U.S. PATENT DOCUMENTS

| | | | | |
|---|---|---|---|---|
| 4,602,828 A | * | 7/1986 | Omata | 312/237 |
| 4,635,763 A | * | 1/1987 | Omata | 312/319.1 |
| 4,660,881 A | * | 4/1987 | Komeya et al. | 188/290 |
| 4,694,530 A | * | 9/1987 | Foggini | 16/82 |
| 4,828,344 A | * | 5/1989 | Omata | 312/319.1 |
| 4,893,522 A | * | 1/1990 | Arakawa | 188/290 |
| 5,052,728 A | * | 10/1991 | Fukumoto | 292/106 |
| 5,211,269 A | * | 5/1993 | Ohshima | 188/290 |
| 5,277,282 A | * | 1/1994 | Umemura | 188/290 |
| 5,301,775 A | * | 4/1994 | Nedbal et al. | 188/290 |
| 5,388,901 A | * | 2/1995 | Asano | 312/319.1 |
| 5,497,863 A | * | 3/1996 | Schmidt et al. | 188/306 |
| 6,154,924 A | | 12/2000 | Woo | |
| 6,840,353 B1 | * | 1/2005 | Arisaka | 188/83 |

FOREIGN PATENT DOCUMENTS

| | | | |
|---|---|---|---|
| JP | 01-247833 | | 10/1989 |
| JP | 06-73945 | | 3/1994 |
| JP | 6-81533 A | * | 3/1994 |
| JP | 08-49744 | | 2/1996 |
| JP | 10-318318 | | 12/1998 |
| JP | 2000-247175 | | 9/2000 |
| JP | 2002-106238 | | 4/2002 |
| JP | 2002-250388 | | 9/2002 |

* cited by examiner

Primary Examiner—Rodney H. Bonck

(57) ABSTRACT

A heart cam and damper unit includes a base member having fixed cylindrical portions and a stopper portion, a rotating member having a movable cylindrical portion which is rotatably assembled to the fixed cylindrical portion with a viscous fluid interposed between the movable cylindrical portion and the fixed cylindrical portions, and a pinion gear rotating integrally with the movable cylindrical portion, a heart cam member rotatable fitted around an outer periphery of an outwardly located one of the fixed cylindrical portion and the movable cylindrical portion, and a device interposed between the base member and the heart cam member and adapted to rotatably urge the heart cam member toward the stopper portion. The heart cam and damper unit is interposed between a main body portion and a movable portion which undergoes opening and closing action with respect to the main body portion and is constantly urged in an opening direction.

20 Claims, 9 Drawing Sheets

HEART CAM AND DAMPER UNIT AND OPENING/CLOSING CONTROLLING DEVICE USING THE SAME

BACKGROUND OF THE INVENTION

1. Field of the Invention

The present invention relates to a heart cam and damper unit used for the opening/closing control of a drawer-type accommodating apparatus such as an ashtray, a table or a cup holder which is mounted in a vehicle compartment, for example, as well as an opening/closing controlling device using the same.

2. Description of the Related Art

A drawer-type accommodating apparatus such as an ashtray, a table, a cup holder or a card holder is installed in a vehicle compartment of an automobile or the like. A push-open type lock device using a heart cam is generally adopted for such an accommodating apparatus.

As such a lock device, JP-A-2002-106238 discloses a push-open type lock device for an accommodating apparatus having an opening and an opening and closing member for opening and closing this opening, which includes a hard pin member provided on one of the opening and the opening and closing member, and a cam member provided rotatablly on the other one of the opening and the opening and closing member and rotatablly urged in one direction by urging means. The lock device is constructed such that, in conjunction with the opening and closing operation of the opening and closing member, the pin member and the cam member are engaged to undergo relative movement, and the pin member collides with a predetermined portion of a cam face formed on the cam member during the relative movement. A soft member is provided at a portion of the cam member where the pin member collides in the lock device.

In addition, in such a drawer-type accommodating apparatus, a movable portion is constantly spring urged in an opening direction (drawing direction), and if the pin member is disengaged from a heart cam, the movable portion is adapted to be automatically opened by the spring force. Such a drawer-type accommodating apparatus is constructed such that a drawer portion springs out forcibly by the spring force when the pin member is disengaged from the heart cam by slightly pushing in the drawer portion. Therefore, a damper is provided to damp that force and send out the drawer portion safely at a fixed speed. In addition, if the drawer portion could be pushed in speedily with a strong force, the drawer portion and an accommodating apparatus body would collide with each other strongly, and collision noise would be produced. However, since the damper restricts the speed of the drawer portion to a safe and fixed speed against the speedy and strong force, the drawer portion and the accommodating apparatus body do not collide with each other strongly. Therefore, the occurrence of the collision noise can be prevented.

An example of the accommodating apparatus having such a damper is disclosed in JP-A-2000-247175. An ashtray apparatus for a vehicle disclosed in the publication includes a housing mounted on a vehicle body side; an accommodating body held in such a manner as to be capable of being drawn into and out of the housing; a rack member having a rack provided on one of the accommodating body and a vehicle body-side member including the housing and extending continuously in the drawing-in-and-out direction of the accommodating body; a pinion with a damper having a damper which is provided on the other one of the accommodating body and the vehicle body-side member including the housing, rotates by meshing with the rack in conjunction with the drawing in and out of the accommodating body, and restricts the rotational speed; a gear with a spiral spring meshing with the pinion with a damper and having a spiral spring for urging the pinion with a damper in a direction of pushing out the accommodating body; a retaining mechanism for retaining the accommodating body at an accommodating position and capable of canceling the retention; and an initial urging means provided for urging the accommodating body in a pushing-out direction only during an initial portion when the accommodating body begins to be opened.

JP-A-2002-106238 and JP-A-2000-247175 are known as related art.

However, in the conventional accommodating apparatus with a damper shown in JP-A-2000-247175, the lock device which has the heart cam and the pin member, and the damper device which imparts a braking force to the movement of the movable portion are separately assembled. Therefore, there have been problems in that it is necessary to individually assemble a plurality of parts, and that parts management becomes troublesome since the number of component parts increases.

SUMMARY OF THE INVENTION

An object of the invention is to provide a heart cam and damper unit which improves the efficiency in assembly operation of an opening and closing device such as a drawer device for mounting in a vehicle, and facilitates parts management by reducing the number of component parts at the time of assembly, as well as an opening/closing controlling device using the same.

In accordance with a first aspect of the invention, a heart cam and damper unit of the invention has: a base member having a fixed cylindrical portion and a stopper portion; a rotating member having a movable cylindrical portion which is rotatablly assembled to said fixed cylindrical portion with a viscous fluid interposed between said movable cylindrical portion and said fixed cylindrical portion, and a pinion gear which rotates integrally with said movable cylindrical portion; a heart cam member which is rotatablly fitted around an outer periphery of an outwardly located one of said fixed cylindrical portion and said movable cylindrical portion; and urging means which is interposed between said base member and said heart cam member, and is adapted to rotatablly urge said heart cam member toward said stopper portion of said base member.

According to the above-described aspect of the invention, as the base member is fixed to a main body such as a housing of the opening/closing device or a movable portion such as a cover, the heart cam and the damper can be mounted at the same time. Further, by providing a pin member which abuts against the heart cam member in conjunction with the movement of the movable portion and is detachably engaged therewith, it is possible to easily construct a lock mechanism for the movable portion. In addition, by providing a rack which meshes with the pinion gear and undergoes relative movement while rotating the pinion gear in conjunction with the movement of the movable portion, it is possible to impart damping force with respect of the moving operation of the movable portion. Since the heart cam and the damper are thus mounted on the same base member, are formed as a unit, which is disposed on the main body portion or the movable portion of the opening/closing device, the number of assembly steps decreases and the work efficiency improves. Since the number of component parts at the time of assembly is reduced, parts management can be facilitated, further the opening/closing controlling device can be made compact and lightweight.

In addition, if the urging force of the urging means with respect to the heart cam member is set in advance such that, in a case where, for example, the vehicle has collided and the cover is pushed in by the impact, the inertial force of the heart cam member overcomes the urging force of the urging means, and the heart cam member does not rotate in the urging direction of the urging means, even if the cover is pushed in by the shock at the time of the collision, the pin member can be prevented from being dislocated from the heart cam member. Theregore, it is possible to prevent the cover from being opened inadvertently.

In accordance with a second aspect of the invention, there is provided an opening/closing controlling device interposed between a main body portion and a movable portion which undergoes opening and closing action with respect to said main body portion and is constantly urged in an opening direction, so as to impart locking and damping action with respect to said movable portion, wherein a heart cam and damper unit, which comprises: a base member having a fixed cylindrical portion and a stopper portion; a rotating member having a movable cylindrical portion which is rotatablly assembled to said fixed cylindrical portion with a viscous fluid interposed between said movable cylindrical portion and said fixed cylindrical portion, and a pinion gear which rotates integrally with said movable cylindrical portion; a heart cam member which is rotatablly fitted around an outer periphery of an outwardly located one of said fixed cylindrical portion and said movable cylindrical portion; and urging means which is interposed between said base member and said heart cam member, and is adapted to rotatablly urge said heart cam member toward said stopper portion of said base member, is installed on one of said main body portion and said movable portion through said base member, a gear, which is meshed with said pinion gear, is provided which undergoes relative movement with respect to said heart cam and damper unit in conjunction with a movement of said movable portion, and a pin member is provided which is engaged with and disengaged from said heart cam member in conjunction with the movement of said movable member.

According to the above-described aspect of the invention, as the movable portion moves, the pinion gear meshing with the gear rotates, the movable cylindrical portion rotates with respect to the fixed cylindrical portion, and a shearing force acts in the viscous fluid interposed between them, so that rotational resistance based on the flow resistance of the viscous fluid is generated. Therefore, damping action can be obtained. In addition, when the pin member abuts against and is engaged with the heart cam member, the movable portion become locked with respect to the main body portion. If the pin member moves away from the heart cam member, the movable portion moves in the opening direction by the urging means. Thus, by using the heart cam and the damper unit in which the heart cam and the damper are integrated, the opening/closing controlling device exhibiting locking and damping action can be constructed with high efficiency in assembly operation with a small number of component parts.

The gear meshing with the pinion gear of the heart cam and damper unit includes various gears including a spur gear, a rack, a sector gear, and the like.

In accordance with a third aspect of the invention, there is provided the opening/closing controlling device, wherein said main body portion is a housing, said movable portion is a cover which is rotatablly mounted to said housing so as to open and close an opening of said housing, said heart cam and damper unit is mounted to said housing through said base member, said gear which is interlocked with a rotation of said cover is meshed with said pinion gear of said heart cam and damper unit, and said pin member which moves in conjunction with the rotation of said cover is engaged with and disengaged from said heart cam member.

According to the above-described aspect of the invention, if the cover is opened or closed, the gear interlocked with the rotation of the cover rotates the pinion gear meshing therewith. Therefore, damping action can be obtained by the viscous fluid filled between the fixed cylindrical portion and the movable cylindrical portion. If the pin member moving in conjunction with the rotation of the cover abuts against and is engaged with the heart cam member, the cover can be locked with respect to the housing. If the pin member moves away from the heart cam member, the cover can be opened by the urging means.

In accordance with a fourth aspect of the invention, there is provided the opening/closing controlling device, wherein the main body portion is a casing, the movable portion is a drawer member which is slidably drawn into and out of the casing, said heart cam and damper unit is mounted on one of the casing and the drawer member through the base member, a rack, which is meshed with said pinion gear, undergoing relative movement with respect to said heart cam and damper unit in conjunction with the movement of the movable portion is provided on another one of the casing and the drawer member, and a pin member is provided which is engaged with and disengaged from said heart cam.

According to the above-described aspect of the invention, if the drawer member is drawn in or out, the rack undergoes relative movement with respect to the heart cam and damper unit. Therefore, the pinion gear meshing with the rack rotates, then damping action can be obtained by the viscous fluid filled between the fixed cylindrical portion and the movable cylindrical portion. If the pin member abuts against and is engaged with the heart cam member, the drawer member can be locked in a pushed-in state. If the pin member moves away from the heart cam member, the drawer member can be pushed out by the urging means.

In accordance with a fifth aspect of the invention, there is provided an opening/closing controlling device has: a base member having a fixed cylindrical portion and a stopper portion; a rotating member having a movable cylindrical portion which is rotatablly assembled to said fixed cylindrical portion with a viscous fluid interposed between said movable cylindrical portion and said fixed cylindrical portion, and a pinion gear which rotates integrally with said movable cylindrical portion; a heart cam member which is rotatablly fitted around said fixed cylindrical portion; and a spring which is interposed between said base member and said heart cam member, and is adapted to rotatablly urge said heart cam member toward said stopper portion of said base member.

In accordance with a sixth aspect of the invention, there is provided the opening/closing controlling device in which said heart cam member is supported between said base member and an annular portion of said movable cylindrical portion.

In accordance with a seventh aspect of the invention, there is provided the opening/closing controlling device in which a circular first recessed portion is provided on a surface of said heart cam member which faces said base member, and a part of said spring is fit in said first recessed portion.

In accordance with a eighth aspect of the invention, there is provided the opening/closing controlling device in which a circular second recessed portion is provided on a surface of said base member which faces said heart cam member, and a part of said spring is fit in said second recessed portion.

In accordance with a ninth aspect of the invention, there is provided the opening/closing controlling device in which said base member has a fixing portion for fixing said opening/closing controlling device to a member to be fixed, and said heart cam member is disposed not to overlap with said fixing portion. Therefore, when the base member is fixed to or remove from the member to be fixed, the workability promotes because the heart cam member does not obstruct.

BRIEF DESCRIPTION OF THE DRAWINGS

FIGS. 5A and 5B are explanatory diagrams illustrating the locking action of a heart cam, in which FIG. 5A is a diagram illustrating a state in which a pin member moves along an outer peripheral guide face, and FIG. 5B is a diagram illustrating a state in which the pin member is engaged in an engaging recessed portion;

FIGS. 6A and 6B are explanatory diagrams illustrating the locking action of the heart cam, in which FIG. 6A is a diagram illustrating a state in which the pin member is disengaged from the engaging recessed portion, and FIG. 6B is a diagram illustrating a state in which the pin member has exited from the heart cam;

DETAILED DESCRIPTION OF THE PREFERRED EMBODIMENTS

[Detailed Description of The Invention]
Embodiments of the invention will be explained with reference to the drawings.

FIGS. 1 to 6B illustrate a first embodiment of an opening/closing controlling device in accordance with the invention.

Figure 1:
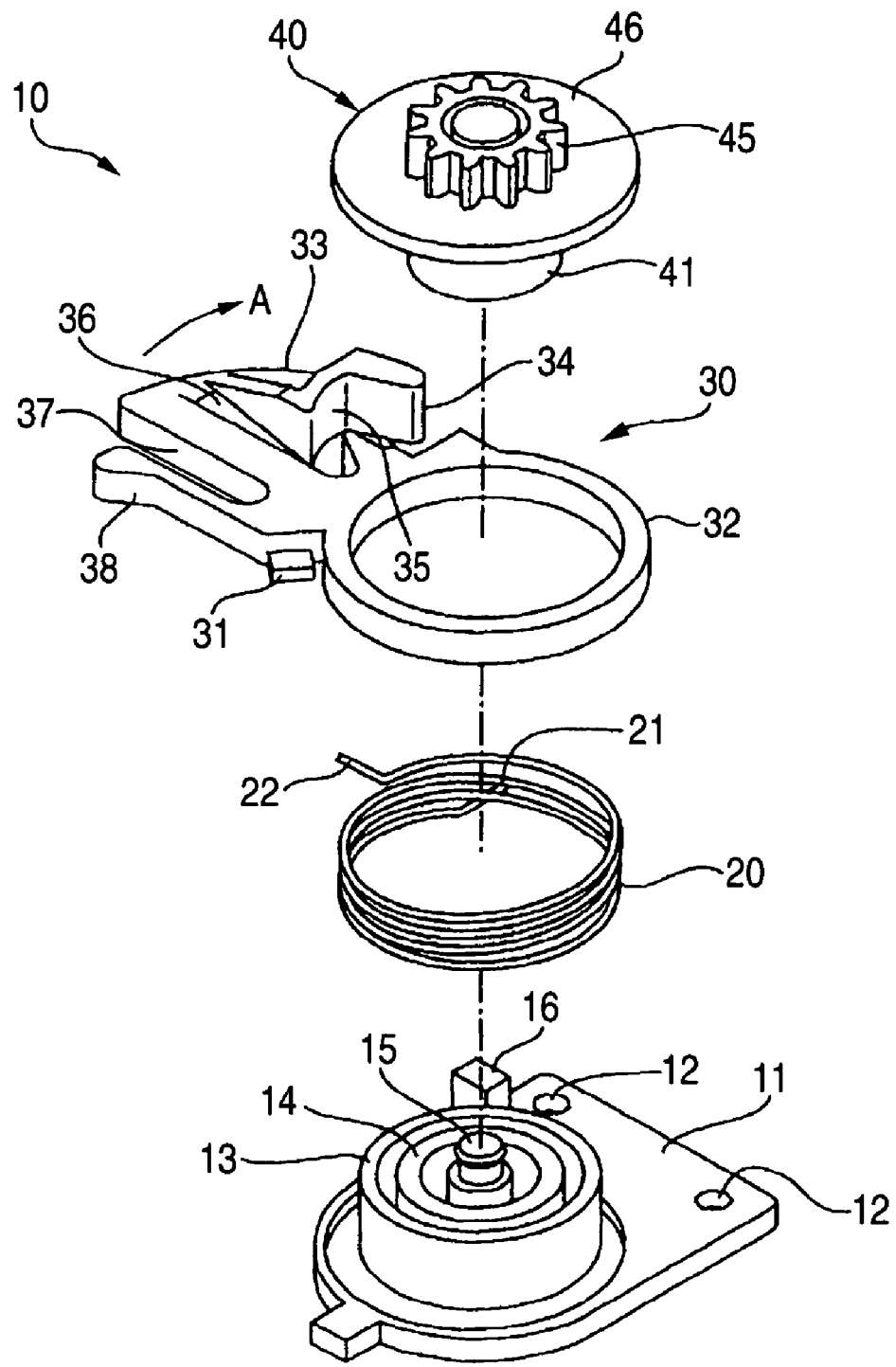
FIG. 1 is an exploded perspective view of a heart cam and damper unit in accordance with an embodiment of the invention.
Figure 2:
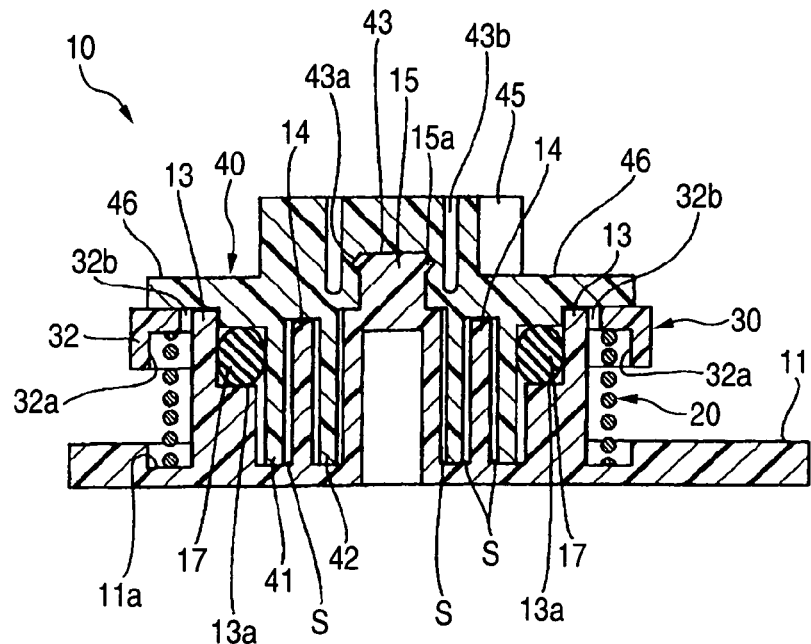
FIG. 2 is a cross-sectional view of the heart cam damper unit.
Figure 3:
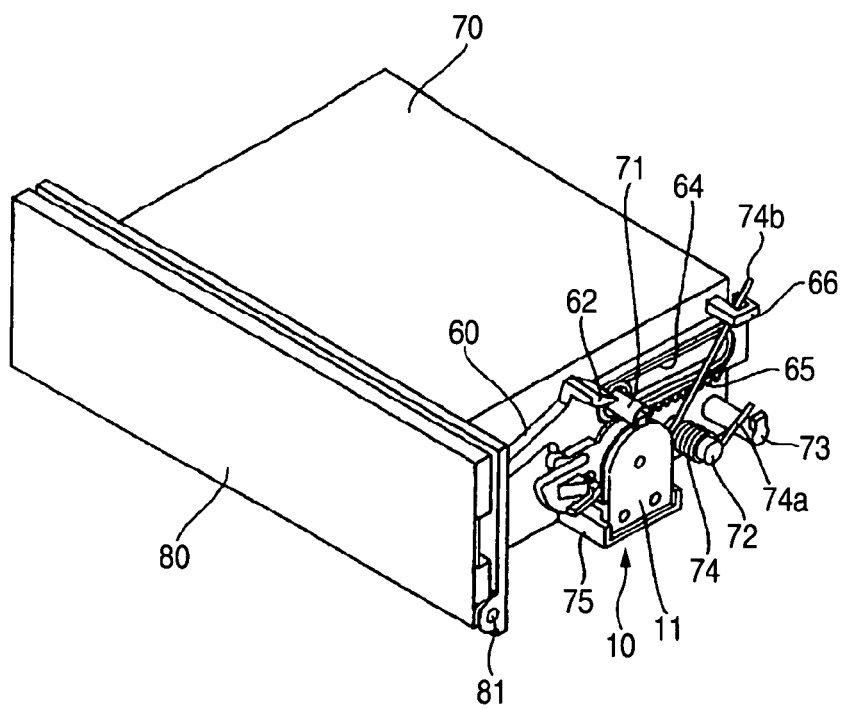
FIG. 3 is a perspective view illustrating an embodiment of the invention which is applied to an opening/closing controlling device for a cover with respect to a housing.
Figure 4A:
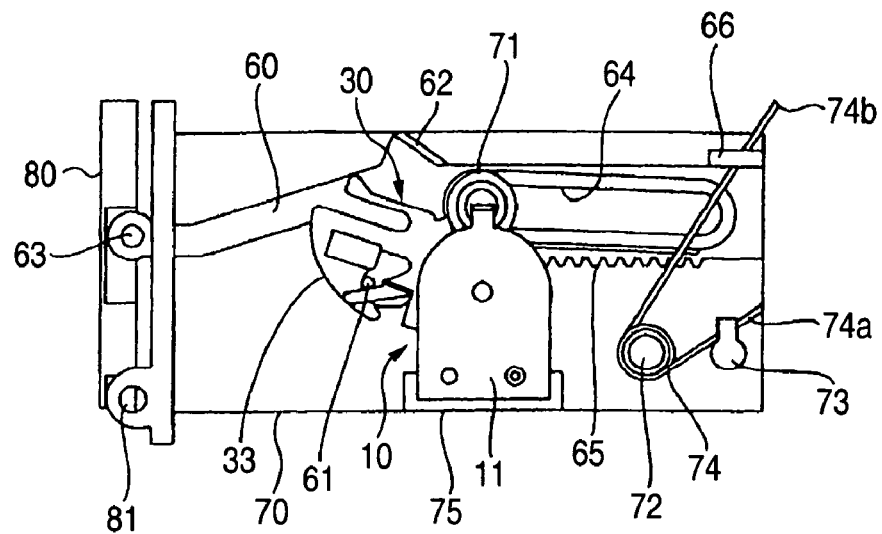
FIG. 4A is a side elevational view of the opening/closing controlling device in a state that the cover is closed.
Figure 4B:
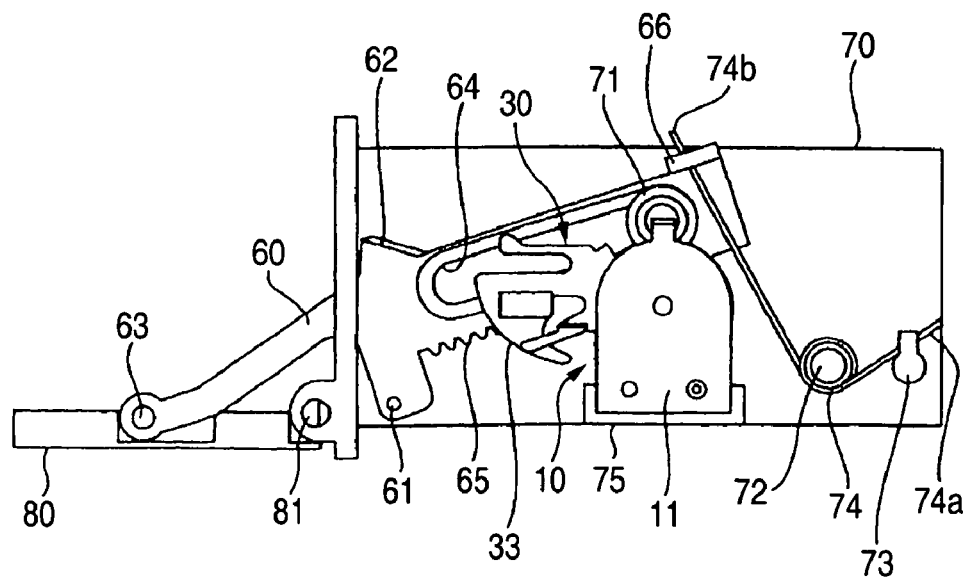
FIG. 4B is a side elevational view of the opening/closing controlling device in a state that the cover is opened.

FIG. 1 is an exploded perspective view of a heart cam and damper unit. FIG. 2 is a cross-sectional view of the hear cam damper unit. FIG. 3 shows an embodiment of the opening/closing controlling device for a cover with respect to a housing. FIG. 4A is a side elevational view of a state that the cover of the opening/closing controlling device is closed. FIG. 4B is a side elevational view of a state that the cover is opened. FIGS. 5A, 5B, 6A, and 6B are explanatory diagrams illustrating the locking action of a heart cam.

As shown in FIGS. 1 and 2, a heart cam and damper unit 10 has a plate-like base member 11. This base member 11 has mounting holes 12 and is adapted to be screwed down to a housing 70 which will be described later. The mounting of the base member 11 to the housing 70 can be also effected by causing pawls projectingly provided on the housing 70 or the base member 11 to engage edge portions or holes of the mating member. An outer fixed cylindrical portion 13, an inner fixed cylindrical portion 14 and a central shaft 15 are uprightly provided concentrically on one surface of the base member 11 with a predetermined gap therebetween. Further, a stopper portion 16 provided uprightly in the form of a pillar is provided on one side of the outer fixed cylindrical portion 13 of the base member 11.

A torsion coil spring 20 is disposed around the outer periphery of the outer fixed cylindrical portion 13 of the base member 11. One end 21 of the torsion coil spring 20 is retained by the stopper portion 16, and the other end 22 thereof is retained by a retaining portion 31 of a heart cam member 30 which will be described later. The torsion coil spring 20 rotatably urges the heart cam member 30 toward the stopper portion 16 in the direction of arrow A in FIG. 1. In addition, the torsion coil spring 20 also functions to cause the heart cam member 30 to abut against the rotating member 40 which will be described later.

Further, as for the base member 11 and a ring portion 32 of the heart cam member 30 against which the coil portion of the torsion coil spring 20 abuts, the torsion coil spring 20 is accommodated in recessed portions 11a and 32a for receiving both end faces of the coil portion of the torsion coil spring 20. Therefore, the thickness of the heart cam and damper unit 10 can be made thin. Therefore, this arrangement is useful because the heart cam and damper unit 10 can be installed without being selective of the place of installation and without taking up much space when it is built into an accommodating apparatus body.

The urging force of the torsion coil spring 20 with respect to the heart cam member 30 is set such that when, for example, the vehicle has collided and a cover 80, which will be described later, is pushed in by the impact, the inertial force of the heart cam member 30 overcomes the urging force of the torsion coil spring 20 and the heart cam member 30 does not rotate in the urging direction of the torsion coil spring 20.

Further, the ring portion 32 of the heart cam member 30 is fitted around the outer periphery of the outer fixed cylindrical portion 13, and the heart cam member 30 is rotatablly supported by means of the outer fixed cylindrical portion 13. As shown in FIG. 2, the ring portion 32 of the heart cam member 30 is fitted around the outer periphery of the outer fixed cylindrical portion 13 with a gap 32b. Thus, the heart cam member 30 rotates along the outer peripheral surface of the outer fixed cylindrical portion 13, and when an external force is applied to the heart cam member 30, an angle formed by the heart cam member 30 and a central axis of the outer fixed cylindrical portion 13 changes. Therefore, the heart cam member 30 is capable of tilting with respect to the outer fixed cylindrical portion 13. At this time, the heart cam member 30 is brought into contact with an annular portion 46 of the rotating member 40, which will be described later, by the urging force of the aforementioned torsion coil spring 20. As a result, a restoring force for causing the heart cam member 30 to return to its original position acts in the heart cam member 30 owing to this urging force, so that the heart cam member 30 can return to its original position from its tilted position when the external force disappears.

Figure 5A:
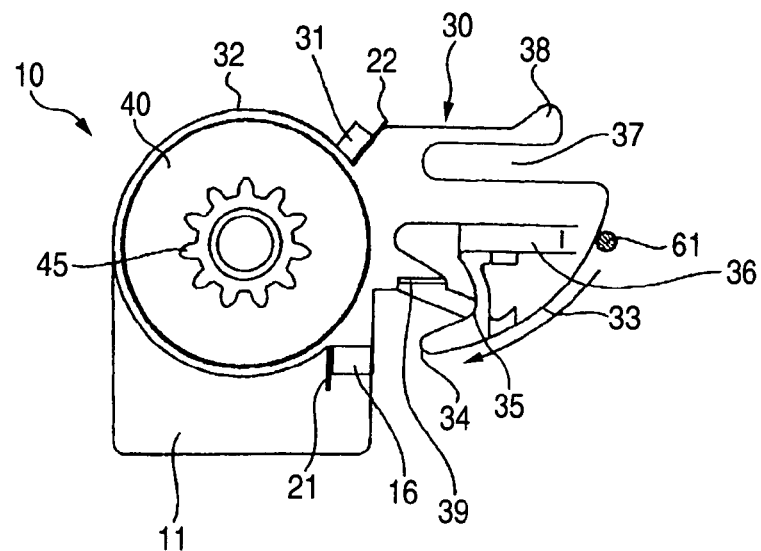
Figure 5B:
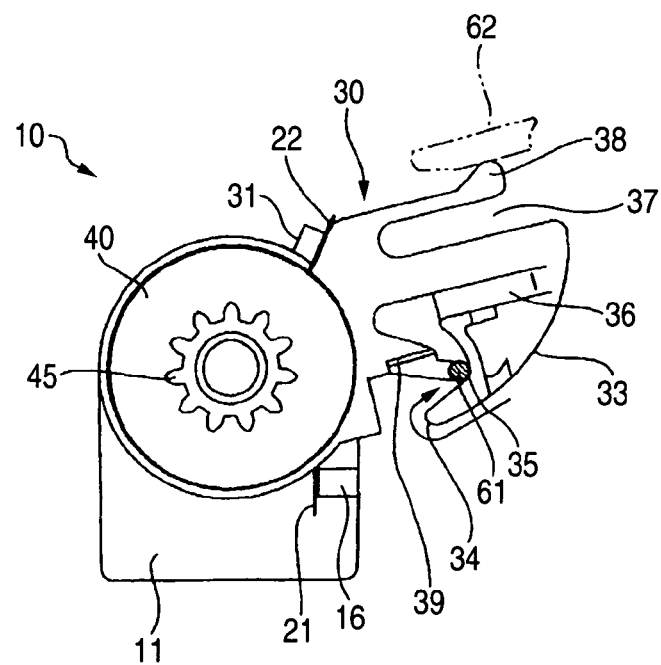

As shown in FIGS. 5A and 5B, the heart cam member 30 has a cam face on which a pin member 61 of a link 60, which will be described later, slides. This cam surface is configured from an outer peripheral guide face 33 which forms a portion of the outer configuration of the heart cam member 30, a projecting portion 34 located at one end of this outer peripheral guide face 33, an engaging recessed portion 35 for forming one side of a groove entering the inner side of the heart cam member 30 from the projecting portion 34, and an exit passage 36 extending straightly from the vicinity of the other end of the outer peripheral guide face 33 toward the rotational center of the heart cam member 30 and connected to an end of the engaging recessed portion 35.

As for the projecting portion 34, the engaging recessed portion 35, a portion of the outer peripheral guide face 33 connected to the projecting portion 34, and a portion of the exit passage 36 connected to the end of the engaging recessed portion 35, their thickness in the thicknesswise direction of the heart cam member 30 is greater than that of the other portions. Therefore, even if the heart cam member 30 is tilted with respect to the outer fixed cylindrical portion 13 when the pin member 61 is sliding on the cam face, the pin member 61 can continuously slide without coming off the cam face. In addition, in the exit passage 36, the cam face of the heart cam member 30 is a face opposing a distal end face of the pin member 61, and the other cam faces are faces opposing a cylindrical surface of the pin 61. Accordingly, the bottom surface of the exit passage 36 constitutes a cam face. As for the exit passage 36, its depth is arranged to be deep at a position closest to the rotational center of the heart cam member 30, and its depth is arranged to be shallow in the vicinity of the other end of the outer peripheral guide face 33. When the pin member 61 slides in the exit passage 36, the distal end face of the pin member 61 is adapted to press the cam face. This pressing force constitutes the aforementioned external force with respect to the heart cam member 30. Meanwhile, since the pin member 61 is movable only in the sliding direction, as will be described later, the heart cam member 30 is arranged to be tilted with respect to the outer fixed cylindrical portion 13.

Further, a spring portion 38 is formed with a U-shaped slot 37 formed on the other side of the outer peripheral guide face 33 which is away from the projecting portion 34. When the pin member 61 is brought into contact with the outer peripheral guide face 33 and the heart cam member 30 rotates, the spring portion 38 is brought into pressure contact with a projecting portion 62 of the link 60, which will be described later, thereby functioning to enhance the urging force of the heart cam member 30 in the direction of arrow A in FIG. 1. Also, in a case where, for example, the vehicle has collided, when the heart cam member 30 rotates in the opposite direction against the urging force of the torsion coil spring 20 owing to its inertial force, the spring portion 38 functions to restrict its rotation within a predetermined angle.

Further, the rotating member 40 is assembled to the base member 11 in a state where the torsion coil spring 20 and the heart cam member 30 are sandwiched between the base member 11 and the rotating member 40. Referring to FIG. 2 as well, the rotating member 40 has a disk shape as a whole. On one surface of the rotating member 40, an outer movable cylindrical portion 41 to be inserted into a gap between the outer fixed cylindrical portion 13 and the inner fixed cylindrical portion 14, and an inner movable cylindrical portion 42 to be inserted into a gap between the inner fixed cylindrical portion 14 and the central shaft 15 are formed. An annular enlarged-diameter portion 15a is formed at a distal end of the central shaft 15, and this enlarged-diameter portion 15a is fitted in an annular groove portion 43a of a recessed portion 43 of the rotating member 40. An annular groove 43b is formed in an outer end face of the rotating member 40 with surrounding its recessed portion 43. Accordingly, when the enlarged-diameter portion 15a of the central shaft 15 is fitted in the annular groove portion 43a, a boss portion formed by the groove 43b is easily deflected toward the outside diameter side.

By adopting such a snap-fitting engagement system, it is possible to obtain a necessary and sufficient engaging force without using parts such as a pin and a snap ring. This leads to a reduction in the number of component parts used, and makes it possible to make the thickness of the heart cam and damper unit 10 thin. In addition, both the rotating member 40 and the base member 11 are formed of a resin material, and a viscous fluid such as silicone oil is sealed in, so that these parts can easily slip in comparison with a normal state. However, the inserting operation can be facilitated because the fitting force at the time of assembly can be alleviated by virtue of the presence of the annular groove 43b.

An enlarged-diameter stepped portion 13a is formed on an inner periphery of the outer fixed cylindrical portion 13, and an O-ring 17 is interposed in the space between the outer fixed cylindrical portion 13 higher than this enlarged-diameter stepped portion 13a and the outer movable cylindrical portion 41. The O-ring 17 is thus supported by clamping the O-ring 17 by providing the enlarged-diameter stepped portion 13a. At this juncture, the wire diameter of the O-ring 17 is made as practically small as possible to make small the sliding resistance of the O-ring 17 with respect to both cylindrical portions 13 and 14. Further, a not-shown viscous fluid such as grease is filled in a gap S between the cylindrical portions sealed by this O-ring 17. Consequently, when the rotating member 40 rotates with respect to the base member 11, a braking force (damping action) due to the viscous fluid is imparted.

In this case, the resistance force which is generated by the frictional resistance between the O-ring 17 and the rotating member 40 and the frictional resistance between the O-ring 17 and the base member 11 is the product of the coefficient of friction and the contact area. However, since the coefficient of static friction acting when the rotating member 40 is stationary and the coefficient of kinetic friction acting when the rotating member 40 undergoes motion differ each other, the resistance force generated by the frictional resistance greatly varies just after the starting and just before the stopping of the rotating member 40.

Meanwhile, the braking force of the damper is the sum of the resistance force based on the frictional resistance and the shear resistance force occurring when the viscous fluid is sheared. In addition, as the O-ring 17 is inserted into the gap slightly smaller than its outside diameter and is deformed flatly, its contact with the members defining the gap is converted from line contact to surface contact. Therefore, O-ring 17 demonstrates hermetically sealing performance.

Accordingly, by adopting the O-ring having a small wire diameter, the contact area is made small, and the resistance force based on the frictional resistance can be made small. At the same time, as the movable cylindrical portions for forming the rotating member 40 are provided at two places, the area of the portions opposing each other through the viscous fluid can be made large. As a result, the shear resistance force based on the viscous fluid becomes large, so that the proportion of the resistance force based on the frictional resistance in the braking force of the damper becomes small. Consequently, it becomes possible to make small the variation of the braking force generated by the damper.

In order to make small the variation of the braking force generated by the damper, the movable cylindrical portions may be provided at three or four places, or a viscous fluid having a large coefficient of viscosity may be sealed in.

As shown in FIGS. 1 and 2, a pinion gear 45 is integrally formed on a surface of the rotating member 40 which is away from its surface on which the outer movable cylindrical portion 41 and the inner movable cylindrical portion 42 are formed.

As shown in FIGS. 3, 4A, and 4B, in this embodiment, the heart cam and damper unit 10 is used as an opening/closing controlling device for the housing 70 and the cover 80. The housing 70 has a shape to be inserted into an instrument panel of a not-shown automobile, and its front side is open. Further, the cover 80 is rotatablly attached to a lower edge of this open front side through pivotal shafts 81.

One end of the link 60 is pivotally supported on one side surface of the cover 80 by means of a pivotal shaft 63. In addition, a guide pin 71 is projectingly provided on one side surface of the housing 70 This guide pin 71 is inserted in an elongated hole 64 formed in such a way as to extend from the other end of the link 60 to a center thereof. A rack 65 for meshing with the pinion gear 45 of the heart cam and damper unit 10 is formed on one side of the link 60 extending along the longitudinal direction thereof parallel to the elongated hole 64.

A supporting pin 72 and a stopper pin 73 are projectingly provided on one side surface of the housing 70. A torsion coil spring 74 is wound around the supporting pin 72. In a state where the torsion coil spring 74 is wound, one end 74a of the torsion coil spring 74 is retained to the stopper pin 73 and another end 74b of the torsion coil spring 74 is retained to a retaining portion 66 formed on the link 60. Accordingly, the link 60 is urged by the torsion coil spring 74 so as to be pushed out in the direction in which the cover 80 is present, so that the cover 80 connected to a tip of the link 60 is constantly urged in a direction in which the cover 80 is opened.

In the heart cam and damper unit 10, the base member 11 is fixed to a supporting plate 75 projected from one side surface of the housing 70. The pinion gear 45 meshes with the rack 65, and the heart cam member 30 is disposed such that its outer peripheral guide face 33 is oriented in the direction in which the cover 80 of the housing 70 is present. The pin member 61 is projectingly provided on the link 60 between the elongated hole 64 and the hole for pivotally supporting the pivotal shaft 63. When the cover 80 is closed, the pin member 61 of the link 60 is adapted to be brought into sliding contact with the outer peripheral guide face 33 of the heart cam member 30.

Next, a description will be given of the operation of the opening/closing controlling device.

When the cover 80 is closed, the link 60 is pushed to move the position of the guide pin 71 with respect to the elongated hole 64, and the link 60 moves in the backward direction (in the direction away from the opening of the housing 70). At this time, the link 60 moves while the state of meshing between the rack 65 and the pinion gear 45 is maintained by the guide pin 71 inserted in the elongated hole 64. Therefore, the rotating member 40 rotates by means of the pinion gear 45. As a result, the movable cylindrical portions 41 and 42 rotate with respect to the fixed cylindrical portions 13 and 14, so that the braking force (damping action) due to the viscous fluid occurs.

Then, as shown in FIG. 5A, the pin member 61 of the link 60 is brought into sliding contact with the outer peripheral guide face 33 of the heart cam member 30, and the pin member 61 moves along the outer peripheral guide face 33 in the direction of the arrow in the drawing. At this time, as shown in FIG. 5B, the heart cam member 30 is pushed by the pin member 61 and rotates against the urging force of the torsion coil spring 20 by using the outer periphery of the fixed cylindrical portion 13 as a pivotal shaft. Further, the spring portion 38 is brought into pressure contact with the projecting portion 62 of the link 60. Thus, the rotation of the heart cam member 30 is prevented. At the same time, the heart cam member 30 is pressed against the pin member 61 by the urging force of the spring portion 38. Therefore, the pin member 61 is not dislocated from the cam face when the pin member 61 slides along the projecting portion 34 of the heart cam member 30. In other words, this demonstrates a jumping prevention effect for preventing the pin member 61, i.e., a follower, from jumping from the cam fact.

Then, when the pin member 61 rides across the projecting portion 34 at the tip of the outer peripheral guide face 33, the heart cam member 30 rotates at a fast speed due to the aforementioned urging force, and the pin member 61 collides with a receiving surface 39 and moves away from the cam face. Then, the link 60 moves forwardly (in the direction toward the opening of the housing 70) due to the urging force of the torsion coil spring 20, so that the pin member 61 fixed to the link 60 is also returned forwardly and is guided into the engaging recessed portion 35. At this time as well, the pin 61 collides with the engaging recessed portion 35, so that collision noise occurs. Thus, the pin member 61 is engaged with the engaging recessed portion 35, and the link 60 is inhibited from moving against the urging force of the torsion coil spring 74, so that the cover 80 is locked in a closed state. The collision noise, which occurs when the pin member 61 collides with the receiving surface 39, can be alleviated by attaching rubber or applying grease or the like to the receiving surface 39 and the engaging recessed portion 35.

The heart cam member 30 is fitted to the outer fixed cylindrical portion 13 of the base member 11 with the gap 32b so as to be rotatable and tiltable, and is constantly urged against the stopper portion 16 by the torsion coil spring 20. Further, large rotational energy is accumulated in the heart cam member 30 since the heart cam member 30 is rotated in opposition to this urging force by the constraint and movement of the pin member 61. When the constraint of the pin member 61 is canceled in this state, the rotational energy is released at a stroke, and the heart cam member 30 collides with the receiving surface 39 and the engaging recessed portion 35. The rotational energy appears as collision noise at the time of the collision. Further, at the time of the collision, since the heart cam member 30 and the outer fixed cylindrical portion 13 are fitted to each other with the gap 32b therebetween, the heart cam member 30 vibrates and the impulsive sound is amplified when the heart cam member 30 collides. The impulsive sound is felt by the user as fairly uncomfortable noise. However, this uncomfortable noise can be reduced by fitting an elastic body to the receiving surface 39 and the engaging recessed portion 35 or to the stopper portion 16 and the ring portion 32, which will be described later. Also, this uncomfortable noise can be alleviated by applying a viscous material to various portions.

As the pin member 61 collides with the cam face of the heart cam member 30 and is disengaged from the cam face, sound is produced four times in total by the opening and closing of the cover 80. Since the sound produced when the pin member 61 collides with the receiving surface 39 is largest, rubber is attached to the receiving surface 39 in this embodiment. It goes without saying that since this sound is produced by the collision of the pin member 61 with the heart cam member 30 and cancellation of the constraint thereof, a similar sound is produced when the opening and closing operation of a drawer member 100, which will be described later, is effected.

Figure 6A:
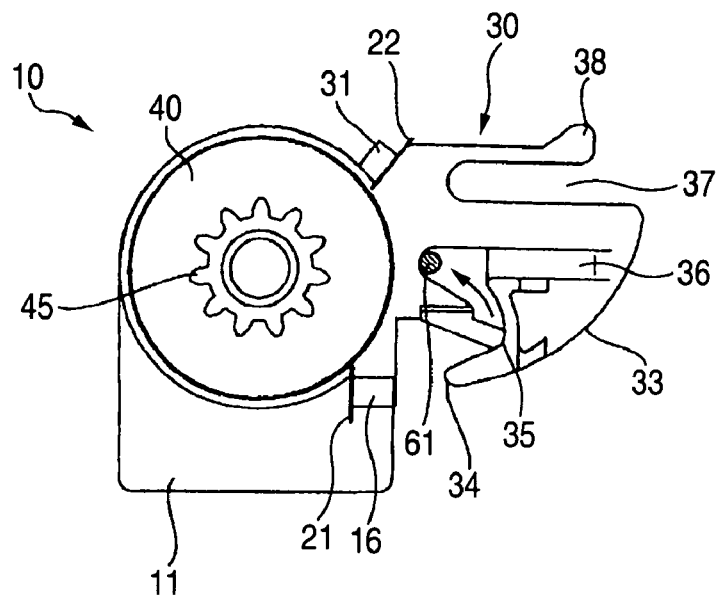
Figure 6B:
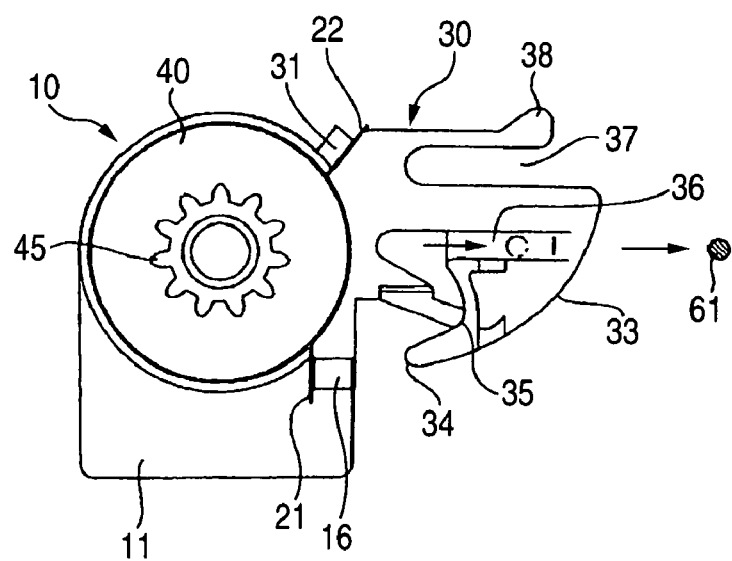

When the cover 80 is opened, if the cover 80 is strongly pushed in again, the link 60 is pushed in further backward as shown in FIG. 6A, and the pin member 61 is disengaged from the engaging recessed portion 35 and moves to the innermost side of the cam groove. At this time, since the heart cam member 30 is urged in the direction toward the stopper portion 16 by the urging force of the torsion coil spring 20, the pin member 61 does not return to the engaging recessed portion 35 and is guided to the exit passage 36.

As a result, the pin member 61 passes along the exit passage 36 and exits outside the heart cam member 30, and the engagement between the pin member 61 and the heart cam member 30 is canceled. Therefore, the link 60 is pushed out forwardly by the urging force of the torsion coil spring 74, so that the cover 80 is opened. At this time as well, the rotating member 40 is rotated through the pinion gear 45 by the movement of the rack 65, and the movable cylindrical portions 41 and 42 rotate with respect to the fixed cylindrical portions 13 and 14, so that the braking force (damping action) due to the viscous fluid occurs. Accordingly, the cover 80 is opened slowly and silently, and does not open in such a manner as to jump out suddenly.

When the pin member 61 is disengaged from the engaging recessed portion 35 at the time of opening the cover 80, the heart cam member 30 collides with the stopper portion 16 to produce a noise. Further, when the pin member 61 slides inside the exit passage 36, the cam face is pushed by a distal end face of the pin member 61. Since the pin member 61 is movable only in the sliding direction, the heart cam member 30 is tilted with respect to the outer fixed cylindrical portion 13. For this reason, when the pin member 61 passes the exit passage 36 and its engagement with the heart cam member 30 is canceled, the ring portion 32 of the heart cam member 30 collides with the flange portion 46 of the rotating member 40 to produce a noise. Such a noise can also be mitigated by attaching an elastic body to the stopper portion 16 and the ring portion 32 or by applying a viscous material to the relevant portions.

Incidentally, in a case where this opening/closing controlling device is applied to a mechanism for opening and closing a cover of such as a glove box of an automobile, in the event that the automobile has collided and made a sudden stop, the cover 80 could be pushed in toward the innermost side of the housing 70 by that shock, thereby canceling the engagement between the pin member 61 and the heart cam member 30. In this case, the cover 80 is opened inadvertently.

However, in the opening/closing controlling device of this embodiment, the urging force of the torsion coil spring 20 with respect to the heart cam member 30 is set such that, in the above-described case, the inertial force of the heart cam member 30 overcomes the urging force of the torsion coil spring 20, and the heart cam member 30 does not rotate in the urging direction of the torsion coil spring 20. Therefore, from the state shown in FIG. 5B, the pin member 61 is only pressed against the receiving surface 39 side, and does not move to the innermost side of the cam groove. For this reason, when the impulsive force ceases, the pin member 61 is engaged again with the engaging recessed portion 35, so that it is possible to restrict the movement of the link 60 in the forward direction and maintain the cover 80 in the closed state.

Thus, if the heart cam and damper unit 10 of the embodiment is used, a lock device and a damper device can be simultaneously installed by merely fixing the heart cam and damper unit 10 to the supporting plate 75 of the housing 70, so that it is possible to remarkably improve the assembling efficiency. In addition, since the lock device and the damper device can be compactly installed as a set in one location, the opening/closing controlling device as a whole becomes compact.

Figure 7:
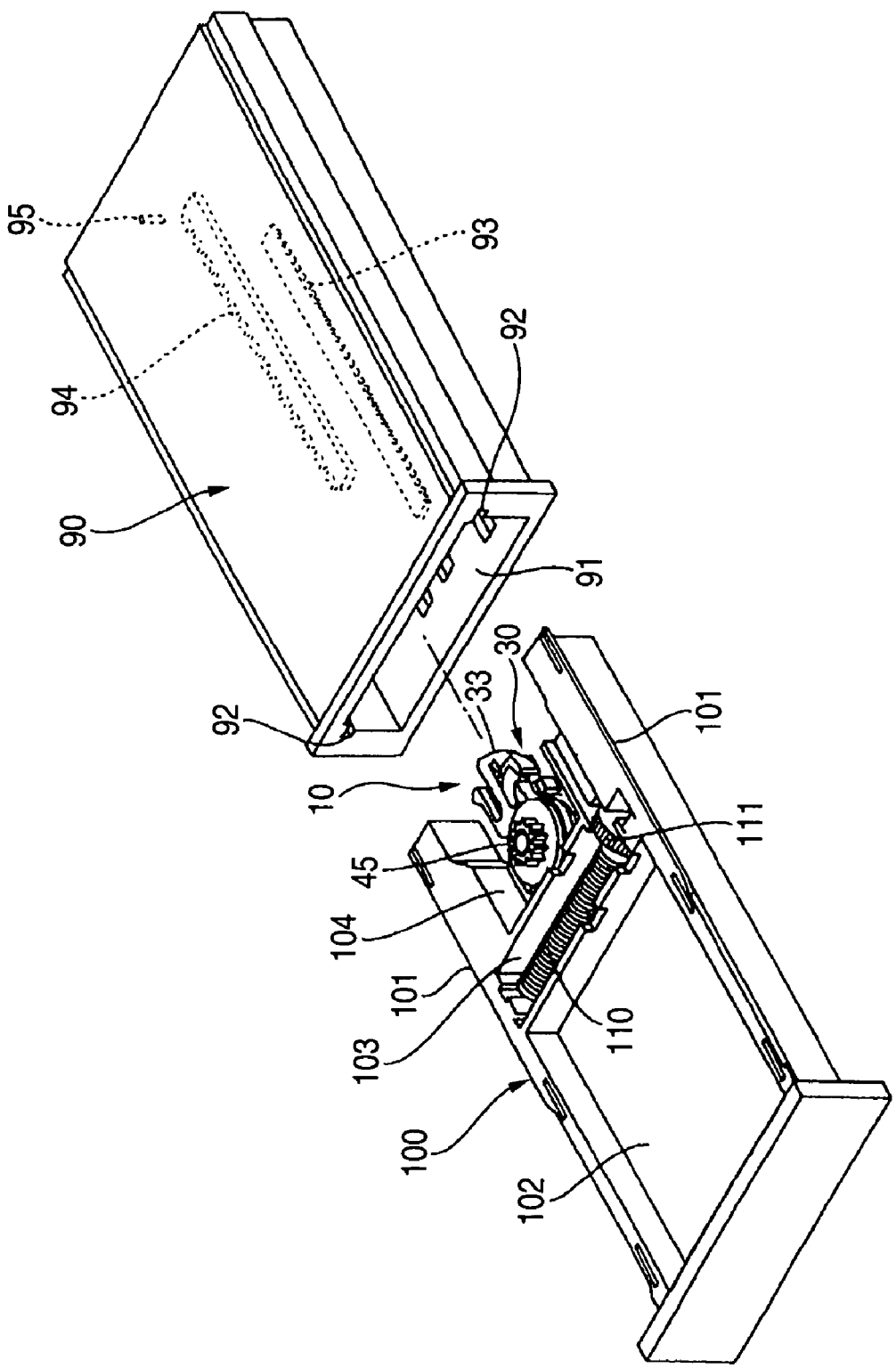
FIG. 7 is an exploded perspective view illustrating another embodiment of the invention which is applied to an opening/closing controlling device for a drawer member with respect to a casing.
Figure 8A:
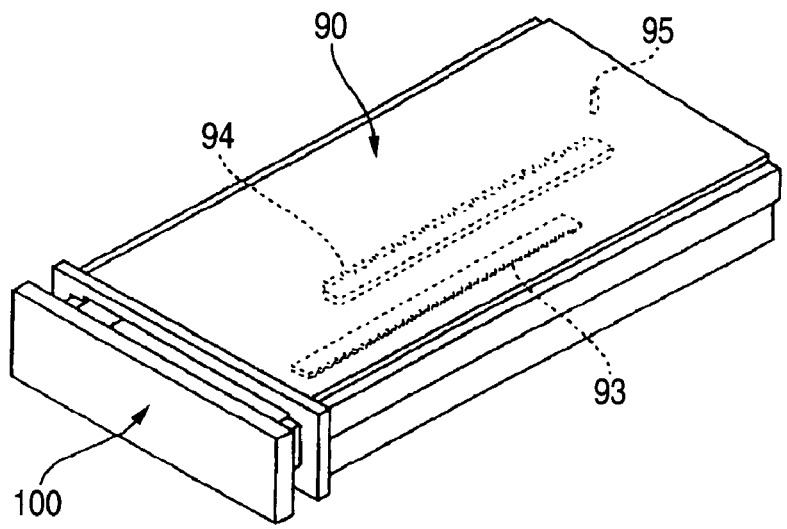
FIG. 8A is a perspective view of the opening/closing controlling device in a state that the drawer member is closed.
Figure 8B:
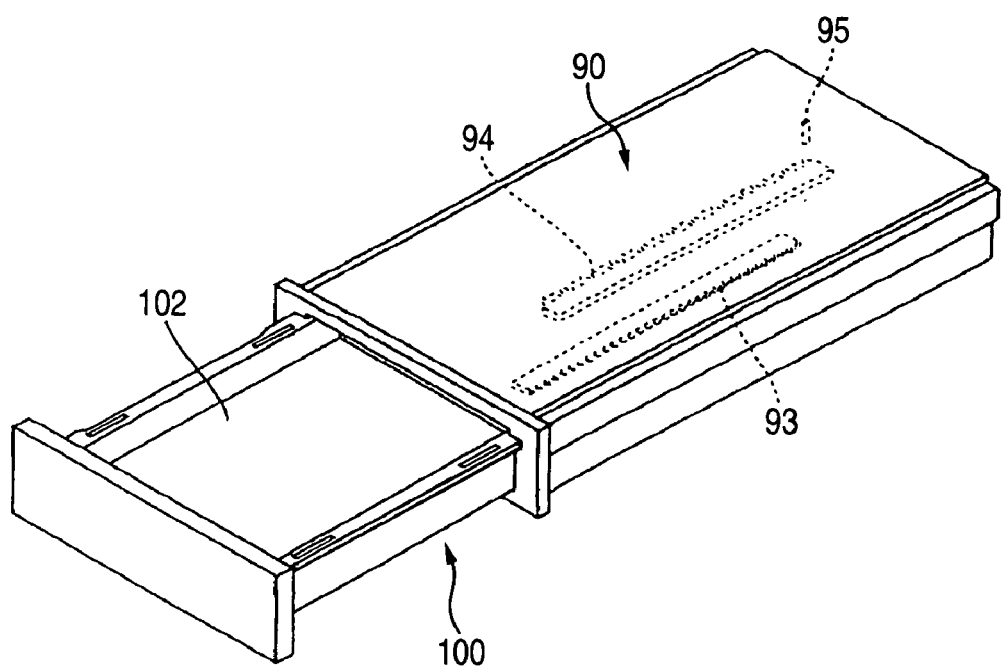
FIG. 8B is a perspective view of the opening/closing controlling device in a state that the drawer member is opened.

FIGS. 7, 8A, and 8B illustrate another embodiment of the opening/closing controlling device in accordance with the invention. FIG. 7 is an exploded perspective view, FIG. 8A is a perspective view illustrating a state in which the drawer member is closed, and FIG. 8B is a perspective view illustrating a state in which the drawer member is opened. Those portions that are substantially identical to those of the above-described embodiment are denoted by the same reference numerals, and a description thereof will be omitted.

An opening/closing controlling device of this embodiment has a box-shaped casing 90 which is accommodated in an instrument panel or the like of a not-shown automobile, and a tray-shaped drawer member 100 which is retractably inserted in this casing 90.

The casing 90 has an insertion slot 91 for the drawer member 100. A pair of guide ways 92, into which both flanges 101 of the drawer member 100 are inserted, are formed in both side inner walls of the insertion slot 91.

A recessed portion 102 for accommodating articles, a recessed portion 103 for accommodating a torsion coil spring 110, and a portion 104 for installing the above-described heart cam and damper unit 10 of the invention are provided on the upper surface of the drawer member 100.

The torsion coil spring 110 is fitted to an outer side of a not-shown rotating shaft, and a gear 111 is integrally attached to the rotating shaft. One end of the torsion coil spring 110 is fixed to that rotating shaft, and another end of the torsion coil spring 110 is fixed to the drawer member 100. The torsion coil spring 110 is twisted by the rotation of the aforementioned rotating shaft, and rotational energy for producing an urging force is stored therein.

The gear 111 meshes with a first rack 93 formed on an upper inner wall of the insertion slot 91 of the casing 90, and is constantly urged in the direction of opening the drawer member 100 by the urging force of the torsion coil spring 110.

As shown in FIG. 7, the heart cam and damper unit 10 is disposed such that the outer peripheral guide face 33 of the heart cam member 30 faces the innermost side of the insertion slot 91, and that the pinion gear 45 faces upward. The pinion gear 45 meshes with a second rack 94 formed on the upper inner wall of the insertion slot 91 of the casing 90.

Further, a pin member 95 which is detachably engaged with the heart cam member 30 is attached to the innermost side of the insertion slot 91 of the casing 90. Since the engaging action between the heart cam member 30 and the pin member 95 is the same as the above-described embodiment, a description thereof will be omitted.

In this embodiment, if the drawer member 100 is pushed in, the heart cam member 30 is engaged with the pin member 95, and the drawer member 100 is locked in the pushed-in state. At this time, since the rack 93 rotates the rotating shaft of the torsion coil spring 110 through the gear 111, the torsion coil spring 110 is further tightly wound, so that the urging force in the opening direction with respect to the drawer member 100 is further enhanced.

If the drawer member 100 is strongly pushed in again, the engagement between the heart cam member 30 and the pin member 95 is canceled by the mechanism described in the foregoing embodiment, and the drawer member 100 is pushed out by the urging force of the torsion coil spring 110.

At this time, since the rack 94 is meshed with the pinion gear 45, the braking force (damping action) is applied by the above-described fixed cylindrical portions 13 and 14, the movable cylindrical portions 41 and 42, and the action of the viscous fluid filled in the gaps therebetween. Finally, the drawer member 100 is pushed out slowly and silently.

In this embodiment as well, by using the heart cam and damper unit 10 in which the base member 11, the heart cam member 30, and the rotating member 40 are integrated, the assembly of parts is facilitated and parts management is also facilitated.

Figure 9:
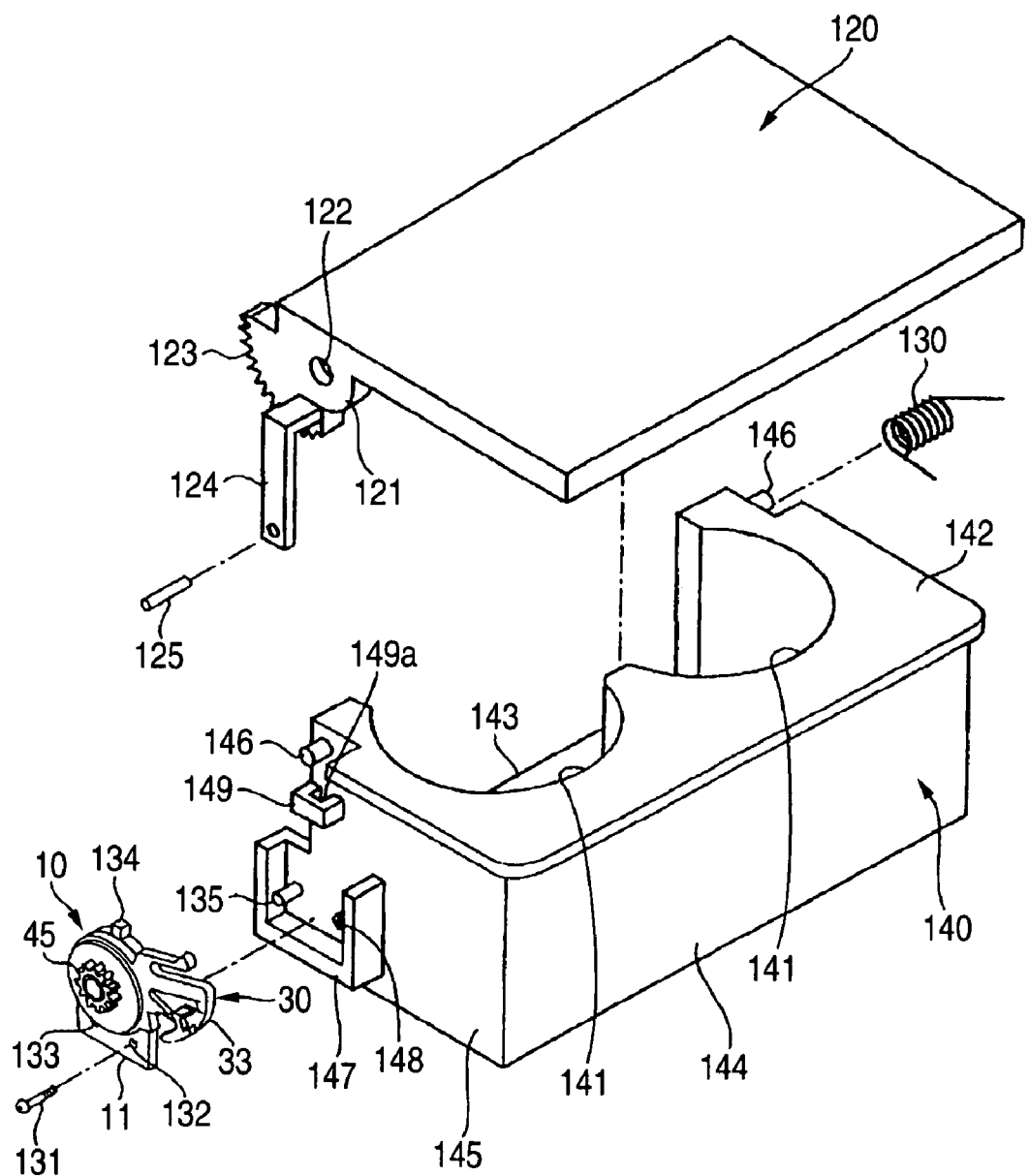
FIG. 9 is an exploded perspective view illustrating still another embodiment in which the opening/closing controlling device in accordance with the invention is applied to an opening/closing mechanism for a cover of a cup holder.
Figure 10:
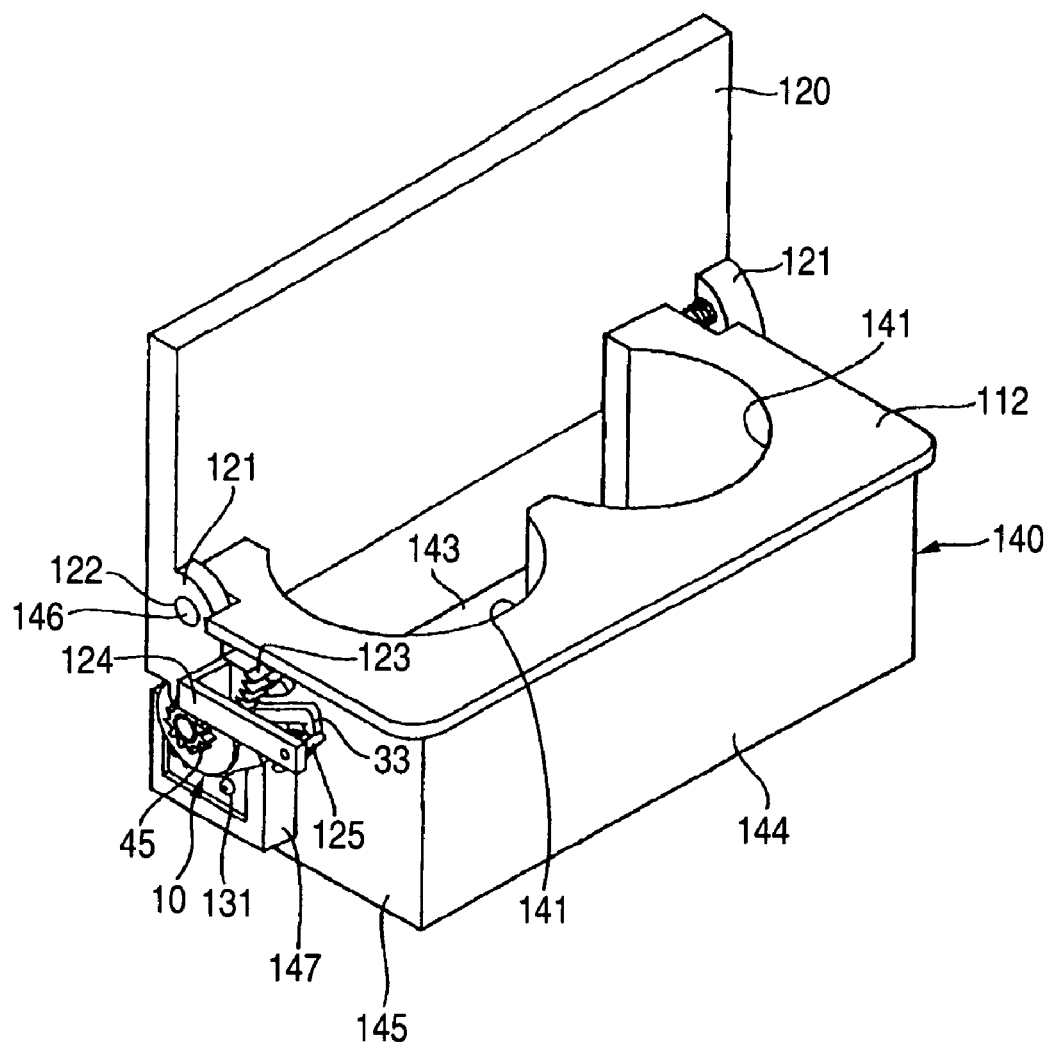
FIG. 10 is a perspective view of a state in which the cover of the opening/closing controlling device is opened.

FIGS. 9 and 10 illustrate still another embodiment in which the opening/closing controlling device in accordance with the invention is applied to an opening/closing mechanism for a cover of a cup holder. FIG. 9 is an exploded perspective view, and FIG. 10 is a perspective view of a state in which the cover is opened. Those portions that are substantially identical to those of the above-described embodiments are denoted by the same reference numerals, and a description thereof will be omitted.

An opening/closing controlling device of this embodiment is applied to a cup holder installed in the vehicle compartment of an automobile or the like, and has a holder body 140 for accommodating a cup. This holder body 140 is box-shaped as a whole, and two arcuate openings 141 are formed in an upper surface 142 in such a manner that two arcuate openings 141 communicate with each other midway. A rear surface of the holder body 140 is open, and a bottom surface 143, a front surface 144, and both side surfaces 145 are closed.

Accordingly, as a paper cup, canned juice, a PET bottle, and the like are inserted in the openings 141, and their bottoms are supported on the bottom surface 143 of the holder body 143, these articles can be held in an upright state.

A cover 120 is rotatablly fitted to the holder body 140 by means of a pair of pivotal shafts 146 provided projectingly on portions of both side surfaces of the holder body 140 which are close to its rear surface. Namely, the cover 120 has a pair of brackets 121 respectively suspended from its both side portions on its rear surface side, and is rotatablly connected to the holder body 140 by inserting the aforementioned pivotal shafts 146 in holes 122 formed in these brackets 121.

A torsion coil spring 130 is fitted on one pivotal shaft 146. This torsion coil spring 130 is in a tightly wound state, in which its one end is fixed to the holder body 140 and its another end is fixed to the cover 120. The torsion coil spring 130 is constantly urged to the cover 120 in the opening direction by repulsion with respect to tight winding. Since the cover 120 abuts against the rear surface of the holder body 140 when it is opened at a substantially vertical angle, the cover 120 is adapted not to rotate further than that.

As for one bracket 121 of the cover 120, its peripheral edge is formed as an arcuate sector gear 123. This sector gear 123 is adapted to mesh with the pinion gear 45 of the heart cam and damper unit 10 in the manner which will be described later.

Further, a lever 124 is provided on that bracket 121 in such a manner that the lever 124 protrudes radially outwardly of the hole 122. A pin member 125 is attached to a distal end portion of this lever 124 in such a manner that the pin member 125 protrudes to the rear side of the lever 124.

On one side surface 145 of the holder body 140, U-shaped rib 147 which opens upwardly, a threaded hole 148, a bracket 149 having a through hole 149a on its inner side, and a pin 135 which outwardly protrudes.

The heart cam and damper unit 10 has a structure basically similar to the one described in the foregoing embodiments. However, it differs in that an insertion hole 132 for a screw 131 to be screwed in the threaded hole 148, a positioning hole 133 into which the pin 135 is inserted, and a positioning projection 134 which is inserted in the through hole 149a of the bracket 149 are formed on the base member 11. The heart cam and damper unit 10 is attached to the holder body 145 by inserting the positioning projection 134 into the through hole 149a, by inserting the pin 135 into the positioning hole 133, and by screwing the screw 131 inserted through the insertion hole 132 into the threaded hole 148.

In this opening/closing controlling device, in the state that the cover 120 is open as shown in FIG. 10, when the cover 120 is rotated around the pivotal shafts 146 in the direction of closing the cover 120, the lever 124 rotates integrally with the cover 120. Then, the pin member 125 attached to the distal end portion of the lever 124 abuts against the outer peripheral guide face 33 of the heart cam member 30, slides along the outer peripheral guide face 33, and is engaged with the heart cam member 30 by action similar to the one described above. As a result, the cover 120 can be maintained in the closed state against the urging force of the torsion coil spring 130.

In addition, in the state in which the cover 120 is closed, when the cover 120 is pressed in the closing direction, the pin member 125 of the lever 124 is disengaged from the heart cam member 30 by action similar to the one described above, and its engagement is canceled. Therefore, the cover 120 can be opened again by the urging force of the torsion coil spring 130. At this time, since the sector gear 123 meshes with the pinion gear 45 and rotates the pinion gear 45, damper action is imparted by action similar to the one described above. As a result, the cover 120 can be slowly opened.

Thus, in the case where the opening/closing controlling device is applied to the opening/closing mechanism for a cover, the heart cam and damper unit 10 may be provided between the main body and the link connected to the cover, as shown in the embodiment shown in FIGS. 1 to 6B, or may be directly provided between the cover and the main body.

As described above, in accordance with these embodiments, the heart cam and the damper are mounted on the same base member, are formed as a unit, and can be mounted as a unit at the time of assembly. Therefore, the efficiency in assembly operation improves, and since the number of component parts at the time of assembly is reduced, parts management can be facilitated, and the opening/closing controlling device can be made compact.

What is claimed is:

1. A heart cam and damper unit comprising:
a base member having a fixed cylindrical portion and a stopper portion;
a rotating member having a movable cylindrical portion which is rotatably assembled to said fixed cylindrical portion with a viscous fluid interposed between said movable cylindrical portion and said fixed cylindrical portion, and a pinion gear which rotates integrally with said movable cylindrical portion;
a heart cam member which is rotatably fitted around an outer periphery of an outwardly located one of said fixed cylindrical portion and said movable cylindrical portion; and
urging means which is interposed between said base member and said heart cam member, and is adapted to rotatably urge said heart cam member toward said stopper portion of said base member.

2. The unit of claim 1, wherein said heart cam member comprises a ring that is rotatably fitted around one of said fixed cylindrical portion and said movable cylindrical portion.

3. The unit of claim 2, wherein said ring and one of said fixed cylindrical portion and said movable cylindrical portion define a gap between them.

4. The unit of claim 1, wherein said fixed cylindrical portion comprises an outer fixed cylindrical portion and an inner fixed cylindrical portion and wherein said movable cylindrical portion comprises an outer movable cylindrical portion and an inner movable cylindrical portion.

5. The unit of claim 1, wherein said base member comprises a central shaft with an annular enlarged diameter portion and wherein said rotating member comprises a recess with an annular groove receiving said annular enlarged diameter portion.

6. The unit of claim 1, wherein said urging means also urges said heart cam member to abut against said rotating member.

7. The unit of claim 1, wherein said rotating member and said heart cam member rotate about said base member about a common axis of rotation.

8. An opening/closing controlling device interposed between a main body portion and a movable portion which undergoes opening and closing action with respect to said main body portion and is constantly urged in an opening direction, so as to impart locking and damping action with respect to said movable portion, wherein
a heart cam and damper unit, which comprises: a base member having a fixed cylindrical portion and a stopper portion; a rotating member having a movable cylindrical portion which is rotatable assembled to said fixed cylindrical portion with a viscous fluid interposed between said movable cylindrical portion and said fixed cylindrical portion, and a pinion gear which rotates integrally with said movable cylindrical portion; a heart cam member which is rotatably fitted around an outer periphery of an outwardly located one of said fixed cylindrical portion and said movable cylindrical portion; and urging means which is interposed between said base member and said heart cam member, and is adapted to rotatable urge said heart cam member toward said stopper portion of said base member, is installed on one of said main body portion and said movable portion through said base member,
a gear, which is meshed with said pinion gear, is provided which undergoes relative movement with respect to said heart cam and damper unit in conjunction with a movement of said movable portion, and
a pin member is provided which is engaged with and disengaged from said heart cam member in conjunction with the movement of said movable member.

9. The opening/closing controlling device according to claim 2, wherein
said main body portion is a housing,
said movable portion is a cover which is rotatably mounted to said housing so as to open and close an opening of said housing,
said heart cam and damper unit is mounted to said housing through said base member,
said gear which is interlocked with a rotation of said cover is meshed with said pinion gear of said heart cam and damper unit, and
said pin member which moves in conjunction with the rotation of said cover is engaged with and disengaged from said heart cam member.

10. The opening/closing controlling device according to claim 2, wherein
said main body portion is a casing,
said movable portion is a drawer member which is slidably drawn into and out of said casing,
said heart cam and damper unit is mounted on one of said casing and said drawer member through said base member,
a rack, which is meshed with said pinion gear, undergoing relative movement with respect to said heart cam and damper unit in conjunction with the movement of said movable portion is provided on another one of said casing and said drawer member, and
a pin member is provided which is engaged with and disengaged from said heart cam.

11. A heart cam and damper unit comprising:
a base member having a fixed cylindrical portion and a stopper portion;
a rotating member having a movable cylindrical portion which is rotatably assembled to said fixed cylindrical portion with a viscous fluid interposed between said movable cylindrical portion and said fixed cylindrical portion, and a pinion gear which rotates integrally with said movable cylindrical portion;
a heart cam member which is rotatable fitted around said fixed cylindrical portion; and
a spring which is interposed between said base member and said heart cam member, and is adapted to rotatably urge said heart cam member toward said stopper portion of said base member.

12. The heart cam and damper unit according to claim 11, wherein said heart cam member is supported between said base member and an annular portion of said movable cylindrical portion.

13. The heart cam and damper unit according to claim 12, wherein a circular recessed portion is provided on a surface of said heart cam member which faces said base member, and
a part of said spring is fit in said recessed portion.

14. The heart cam and damper unit according to claim 13, wherein said base member has a fixing portion for fixing to a member to be fixed, and
said heart cam member is disposed not to overlap with said fixing portion.

15. The heart cam and damper unit according to claim 13, wherein a circular recessed portion is provided on a surface of said base member which faces said heart cam member, and a part of said spring is fit in said recessed portion of said base member.

16. The heart cam and damper unit according to claim 15, wherein said base member has a fixing portion for fixing to a member to be fixed, and said heart cam member is disposed not to overlap with said fixing portion.

17. The heart cam and damper unit according to claim 12, wherein a circular recessed portion is provided on a surface of said base member which faces said heart cam member, and a part of said spring is fit in said recessed portion.

18. The heart cam and damper unit according to claim 17, wherein said base member has a fixing portion for fixing device to a member to be fixed, and said heart cam member is disposed not to overlap with said fixing portion.

19. The heart cam and damper unit according to claim 12, wherein said base member has a fixing portion for fixing to a member to be fixed, and said heart cam member is disposed not to overlap with said fixing portion.

20. The heart cam and damper unit according to claim 11, wherein said base member has a fixing portion for fixing to a member to be fixed, and said heart cam member is disposed not to overlap with said fixing portion.

* * * * *